United States Patent
Nase (10) Patent No.: US 7,480,775 B2
(45) Date of Patent: Jan. 20, 2009

(54) METHOD AND APPARATUS FOR BLOCK-ORIENTED MEMORY MANAGEMENT PROVIDED IN SMART CARD CONTROLLERS

(75) Inventor: Rainer Nase, Vienna (AT)

(73) Assignee: Austria Card Plastikkarten und Ausweissysteme GmbH, Vienna (AT)

( * ) Notice: Subject to any disclaimer, the term of this patent is extended or adjusted under 35 U.S.C. 154(b) by 192 days.

(21) Appl. No.: 10/541,284

(22) PCT Filed: Dec. 30, 2003

(86) PCT No.: PCT/EP03/14961

§ 371 (c)(1),
(2), (4) Date: Dec. 8, 2005

(87) PCT Pub. No.: WO2004/061673

PCT Pub. Date: Jul. 22, 2004

(65) Prior Publication Data

US 2006/0149916 A1    Jul. 6, 2006

(30) Foreign Application Priority Data

Jan. 3, 2003 (EP) .................................. 03000125

(51) Int. Cl.
*G06F 12/00* (2006.01)
(52) U.S. Cl. .................. 711/154; 711/103; 711/170; 711/202; 711/206; 711/209; 714/15; 714/19
(58) Field of Classification Search ............... None
See application file for complete search history.

(56) References Cited

U.S. PATENT DOCUMENTS

| | | | |
|---|---|---|---|
| 5,226,155 A | 7/1993 | Iijima | |
| 5,623,654 A | 4/1997 | Peterman | |
| 5,715,431 A | 2/1998 | Everett et al. | |
| 6,098,077 A * | 8/2000 | Sassa | 707/202 |
| 6,272,607 B1 | 8/2001 | Baentsch et al. | |
| 6,571,326 B2 * | 5/2003 | Spiegel et al. | 711/170 |
| 6,684,289 B1 * | 1/2004 | Gonzalez et al. | 711/103 |
| 6,763,424 B2 * | 7/2004 | Conley | 711/103 |
| 6,883,114 B2 * | 4/2005 | Lasser | 714/19 |
| 2001/0029564 A1 * | 10/2001 | Estakhri et al. | 711/103 |

FOREIGN PATENT DOCUMENTS

| | | |
|---|---|---|
| EP | 0 563 997 A1 | 4/1993 |
| EP | 0 887 732 A1 | 12/1998 |
| EP | 0 969 380 A2 | 1/2000 |

* cited by examiner

*Primary Examiner*—Hyung S Sough
*Assistant Examiner*—Kaushikkumar Patel
(74) *Attorney, Agent, or Firm*—The Maxham Firm (57) ABSTRACT

A method for memory management in smart card controllers by writing of data into a data space in a persistent memory is described. In order to save memory space the persistent memory is split into blocks with fixed data length having logical block numbers; whereby the size of blocks is selected such that it corresponds to the physical size of the pages of the EEPROM memory existing on the card. Fragmented blocks are used by comprising segments being independent from each other, whereby these segments are part of different data fields. A Block Allocation Table (BAT) is used in order to distinguish the physical place of the block in memory from the logical block number and to address different segments in the block.

7 Claims, 7 Drawing Sheets

METHOD AND APPARATUS FOR BLOCK-ORIENTED MEMORY MANAGEMENT PROVIDED IN SMART CARD CONTROLLERS

TECHNICAL FIELD

The present invention relates to transaction Support in Computer Systems with constrained resources. More specifically, the present invention relates to the minimisation of the amount of memory and the number of write-operations required for transaction support in a resource-constrained environment such as a smartcard.

WO 01/71506 A1 offers a method for identification and collection of memory sections that contain information not needed anymore, commonly referred to as garbage.

U.S. Pat. No. 6,272,607 B1 describes a method for transactional writing of data into a persistent memory using an intermediate buffer. A method for saving memory space by using a memory management system is not disclosed.

BACKGROUND OF THE INVENTION

In smartcards, the computing time, communication bandwidth, and transient memory (RAM) are limited. In addition, writing to persistent memory is much more expensive than writing to temporary memory, and finally no assumptions about the integrity of the communications infrastructure can be made.

A problem is that systems with state information residing in a persistent memory such as EEPROM are required to ensure that this information stays consistent even in case of unexpected power losses and other failures.

A transition from one consistent system state to another may involve updates of several cells of persistent memory. These updates should be performed atomically, where either all memory cells are updated or none of them.

If power is lost or some other system failure occurs prior to the completion of the transaction-commit operation, all conditional updates are discarded.

In a resource-constrained environment, such as a smartcard, the size of a transaction buffer is highly critical. Its better to find an implementation, where a transaction buffer isn't need at all. Writing persistent memory is time-consuming compared to reading. The other goal is to reduce the number of expensive write-Operations to persistent Storage needed for transaction support.

Therefore, it is an object of the invention to provide a method and a device for Block-Oriented Memory-Management provided in Smart Card Controllers in order to avoid memory waste and time by using a transaction buffer. It is another object of the invention to have the consistency of transactional writing guaranteed using a new update method.

SUMMARY OF THE INVENTION

The memory managed by the 'Memory Manager' (MM) is grouped into equal memory blocks having logical block numbers. In an appropriate manner the size of the blocks is selected as such that it corresponds to the physical size of the pages of the EEPROM memory existing on the card.

Based on the selection of this size the time for the writing of data within a block is independent of the number of written bytes. To avoid waste of memory by unused remainders of blocks so-called fragmented blocks are used apart from normal whole blocks, which fragmented blocks comprise segments being independent from each other. These segments are part of different data fields.

A memory is made available only through the formation of memory blocks linked with each other.

Block Allocation Table (BAT)

In order to calculate the physical place of the block from the logical block number a Block Allocation Table (BAT) similar to FAT in DOS is used. Depending on the amount of RAM being available the BAT may either be maintained in the non-transient memory (EEPROM) or in the RAM. If it is maintained in the RAM it must always be set up again when starting the card.

However, it is an advantage of the RAM version that in the course of the further operation of the system, those time consuming writing cycles into EEPROM for updating the BAT are omitted.

Furthermore, the block orientation offers the possibility to implement a secure write mechanism.

If data included in a block are updated the block including the new data and those unchanged data of the old block is copied first of all to a new block. Based on the selection of the block size described above copying of the old data does not result in an essential loss of time compared with the writing of the data alone. As long as there are free blocks available desired data may be changed as such without losing the possibility to reject all changes again.

To define the point of no return as exactly as possible, where the new data shall be taken over definitely a bit field having so-called Commit bits is created. A commit bit is also included in the header of each block.

Only if the commit bit included in the block and the commit bit included in the commit field are identical with each other the block is valid. Based on the placing of the corresponding bits in the commit field the shift from old to new blocks is carried out. To switch to validity of a physical block only the corresponding bit in the commit field has to be toggled.

In ideal circumstances all commit bits of the commit field are included in one EEPROM page. By this all validity changes of the blocks are carried out in one step.

The memory management may start now to carry out the necessary changes in the BAT, cancel those old blocks which are no longer required and supply those empty blocks to the pool again.

If this work is interrupted by a power breakdown (removal of the card) it may always be finalized after a new start owing to the commit bits provided.

RAM BAT

The usage of the RAM as a memory location of the BAT ensures an acceleration of write and read accesses in comparison with a BAT written in the EEPROM. Each and every logical block which moves to another physical address must have a new entry in the BAT. With the corresponding expenditure of time this is lasting for one write cycle per BAT block.

In accordance with the invention it is provided now that blocks being often updated are not kept in the EEPROM. Such blocks are kept in the RAM and therefore and with considerable less expenditure of time they must be updated in the RAM only. If the card is started up the RAM is initialized so that the RAM BAT is set up there, and on further operation of the card the RAM BAT is updated only.

However, this is one variant of the invention only. Another variant provides that the chip used is having an essentially greater RAM memory so that the whole BAT may be kept in the RAM completely and has not to be written in the EEPROM as is the case in case of the first variant.

Fragmented Blocks

It is assumed that a data object is 65 bytes long and that the maximum possible block length is 60 bytes only. Therefore it is necessary to divide the data object into two blocks, i.e. one block having 60 bytes which will be filled completely.

However, the other block having a width of 60 bytes is filled with 5 data bytes only. The greatest part of this block filled incompletely would be empty. To avoid this the invention provides for the use of fragmented blocks.

If fragmenting was not allowed the remaining 55 bytes existing in the block would remain empty and unused. The usage of fragmented blocks offers the possibility to occupy partial areas in a total block (segments). For this purpose the block header is extended and, at its beginning, has a list with entries providing information to localize the segments as well as their length.

By this a 60 byte wide whole block is divided (fragmented) into individual segments, and each segment is belonging to a different data object.

The corresponding segment is identified through the block number of the whole block and the number of the individual segment in this way the segment can be clearly identified and assigned. Therefore this results in the possibility to group (split) the whole block into individual segments.

Hardware Orientation and Secure Write

The other aspect to use a block-oriented system is the better orientation towards the structure of the hardware. The EEPROM is structured in so-called pages, the size of which is in nowadays hardware between 16 and 128 bytes. As an example there are 64 bytes wide pages existing. This is the reason that the block having a size of 64 bytes has been selected, and the advantage to use a page is that it may be deleted and written in common. In general, every write access within one page requires the same execution time, because these actions are carried out by the hardware logic as processes accomplished in parallel.

It is preferred that the width of blocks is equivalent to the width of a EEPROM page or is equivalent to an integer part of this width.

A write access to a 64 bytes page is always carried out at the same time and independent of the fact how many bytes are written on this 64 bytes page. Therefore the write accesses are optimized in accordance with the invention.

A further advantage when using pages having a fixed length in the EEPROM is that an improved secure write mechanism may be applied.

If not all data have been written completely it is always possible when storing the data in a memory to go back to the position existing before the data have been written. Therefore this is an atomic access to the memory in a way that all or nothing is being written.

In the prior art the problem was solved as such that first of all data which are required to be written are completely written in an EEPROM buffer. Following the complete writing a sign/symbol is added to the buffer saying that all data have been written now. Only then the buffer may be copied to its final location. Thereafter the buffer is deleted. U.S. Pat. No. 6,272,607 B1 uses an intermediate buffer which is not required in present invention.

If there has been an interruption meanwhile, for example if the card is removed, it is always checked if there is something left in the buffer which has not been written yet. It will be read and written as long as the whole contents of the buffer are definitely at that location, where they belong to. Then the buffer is, deleted. This is the known function of secure write in accordance with the prior art known.

However, it has been recognized by the invention that this effort is unnecessary, because there is a double writing action necessary in accordance with prior art.

First of all there is writing in the buffer, and then the buffer is copied in the course of a copying process and written in the memory again. This double writing process is avoided in accordance with the invention.

In accordance with the invention the organization is carried out in individual blocks, and therefore individual memory blocks may be replaced by each other.

If data are written somewhere which are existing within one block whole blocks are replaced only then. Then the whole block is rewritten again. Because a logical block organization is existing the block being in the logical row of the blocks is replaced, and this one will be replaced by the original block.

It is not necessary to copy the data, but the old data which were in the old block and are not subject to this updating process are copied into the new block and the new data are written and added at the same time. Then there will be a write access to one block having 64 bytes (if the block size is 64), which write access is always lasting for the same period of time, and double writing in one block is unnecessary.

The subdivision into blocks is made, because individual blocks may be very well replaced in the course of an update. At the same time the old block is still available, i.e. at any time desired and if there is an interruption the old block may be activated again and there is a new block, where the new data will be prepared. If all new blocks have been written the new blocks will be declared as being valid and the old blocks may be forgotten only then. Change-over from the old to the new blocks is carried out in the course of the updating process.

Advantages

Inherent secure write;

efficient formation of atomic writing accesses to different data fields with the possibility of roll back and roll forward;

fragmenting of the memory is avoided to a great extent and limited to fields within fragmented blocks only. If necessary, it is relatively easy to create a garbage collection for fragmented blocks.

Serial Organization of Blocks in Form of a Ring List

There are so-called free blocks existing which are used again and again for the acceptation of data. Also, in the course of this updating process a free block must be found first of all, where the data may be written in. For this purpose a reservoir of free blocks is required. In order to have quick access to the blocks these are organized in form of a ring list.

In accordance with the prior art known it was known to provide those free blocks with an initial identification and store it. Starting from this initial identification action the chain of free blocks was addressed continuously. However, it is a disadvantage of this known method that the initial identification must be stored on the occasion of each access desired. If there is a change a new indicator must be stored at the beginning.

However, if, in accordance with the invention, the chain of the blocks it put in a ring there are essential advantages resulting thereof.

In case of a cold start of the card a free block has to be found in the ring list once only, and therefore all blocks are available, because they are positioned in the ring. Therefore storage is not required, where the ring starts. When the card is started the whole memory is scanned once and checked for consistency. On this occasion a free block is searched for. If it has been found its address is stored in the RAM.

This is similar to fragmented blocks which are arranged in a ring as well. Even here if a new memory segment is required the list is scanned to find out where there is a free segment existing. With the help of this list the management of fragmented blocks is very easy. Therefore it is not necessary to remember the beginning of the blocks, because it is unimportant which block is selected from the ring, because there is access to all blocks organized in the ring automatically.

Therefore in accordance with the invention those free and fragmented blocks are organized in the form of a ring.

The Commit Block

In the event of an update copies are made of the original blocks with the new data. In the case of a data object comprising several blocks there are data existing being in a block and which are required to be updated.

A copy of the block is made which includes the new update data as well.

This block is existing twice now. This means that the block having this logical block number is existing twice; on the one hand in the form of the old block and on the other hand in the form of the new block which has been prepared already to replace the old block completely.

It is necessary now to define the moment, where the old block is replaced by the new block. Therefore a commit block is a block, where such bits are provided, only which are assigned to the blocks.

In that moment, where these two bits correspond to each other (e.g. both are 1 or 0) this block is a valid one. The new block set up now is written as such that compared with the bit stored in the commit block a reverse commit bit is assigned to it first of all.

In that moment, where an updating process is demanded from an old block to a new one the commit block is rewritten.

Then the bit from the former old block is put in reverse order to what it is itself in this block, and the bit from the new block is put as such that it corresponds to it.

In that moment, where the commit block is newly written as a whole within one page many blocks desired may be marked as being valid or non-valid at the same time.

DESCRIPTION OF THE DRAWINGS

Examples of the invention are depicted in the drawings and described in detail below by way of example.

It is shown in

Figure 1:
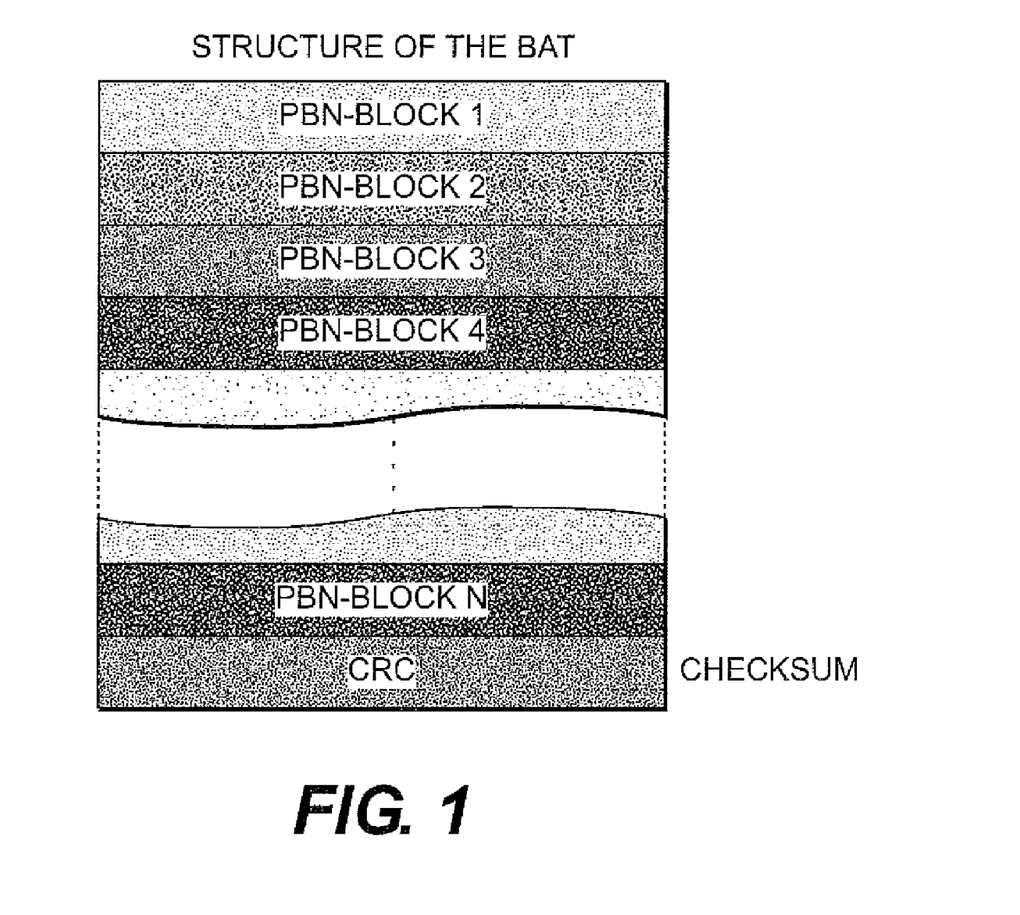
FIG. 1 schematic view of the BAT

In FIG. 1 is depicted the structure of MM (Memory Manager) which uses a block-oriented memory structure. All blocks have the same length and may be identified by their logical block number (LBN). To resolve the LBN to a physical block number (PBN) and the physical address, a block allocation table (BAT) (as shown in FIG. 1) is used.

The BAT may be partly comparable to the FAT in MSDOS. As the block length is fixed there may be huge amount of wasted memory if the data size doesn't fit to multiple of the data block size. To avoid this without losing the advantages of a system with fixed block size, there are so called fragmented blocks which can contain several independent memory segments belonging to different logical data units.

To build data units bigger as the block size the blocks may be linked. The linking is done on a logical level by writing the LBN of the following block to the header of the leading one. A data unit may consist of several (including zero) complete blocks and one or zero fragmented blocks. It's not possible to link several fragmented blocks within a data unit. If there is a fragmented block in a data unit it's always at the end of the unit.

The MM has three layers of memory access. From the view of the MM the upper application layer only knows logical block descriptions (logical block numbers). These are transformed to physical block descriptions with a table. From these the addresses in the memory can then be calculated.

The MM is provided with an inherent 'Secure Write'. This means all write or memory accesses are traceable and cancelable until their final validity.

Figure 2:
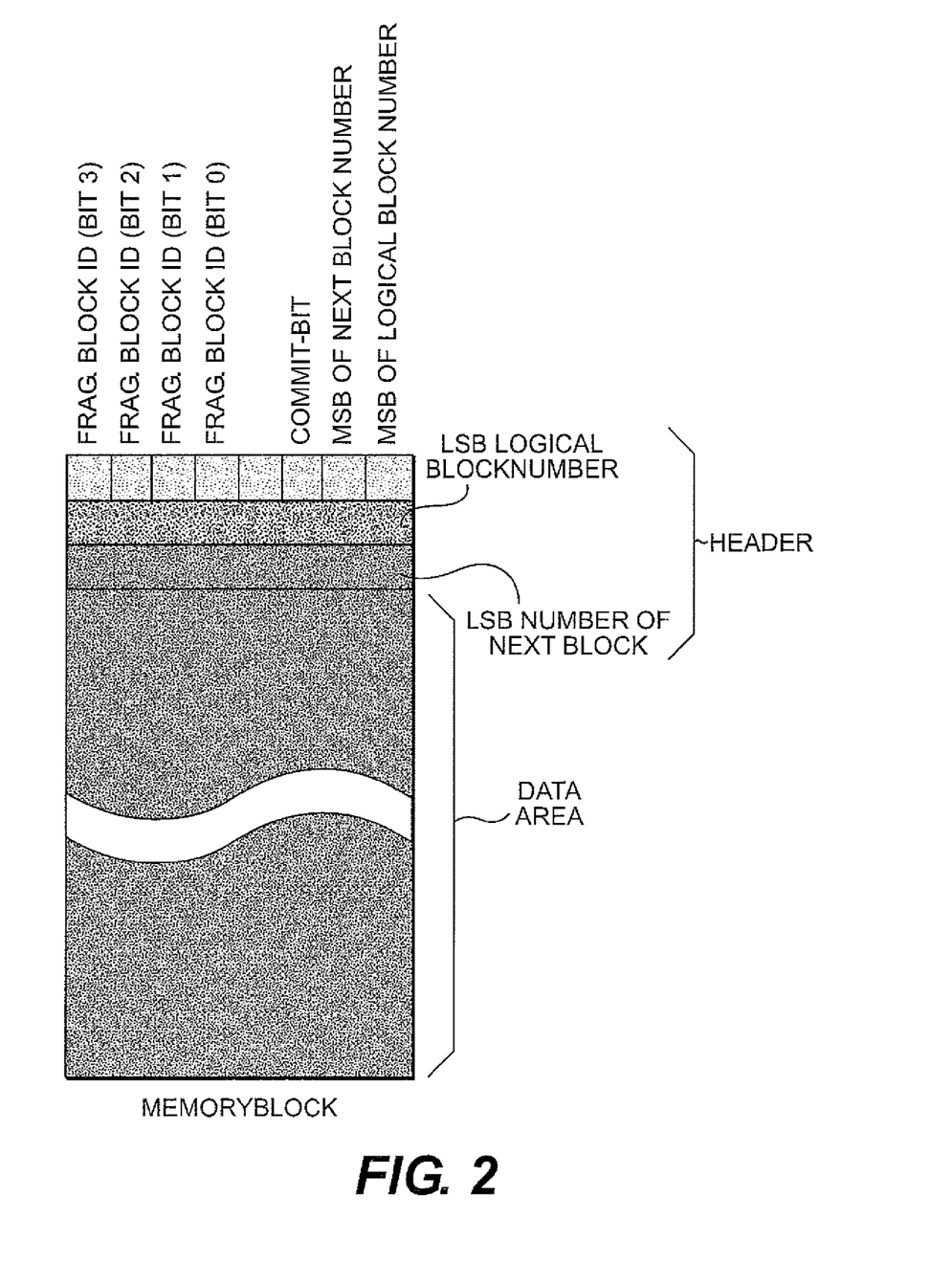
FIG. 2 structure of memory block

As shown in FIG. 1 and just explained above the structure of BAT is constructed as a sequence of logical blocks. The entries consist of the physical block numbers. This means that the physical block number (PBN) referenced by a LBN n is to be found at the $n^{th}$ entry. The PBN represents the physical memory address. In FIG. 2 is depicted the structure of a memory block. Each block consists of a block header and a data area. Besides the LBN of the block itself and LBN of a possibly following block the header contains a 4 bit block ID and a commit bit.

The block ID is used on the one side to identify the type of the block itself and on the other side to identify the segment of possibly following fragmented block.

The coding of the section ID:

0: Block is active (used) not fragmented, no following block or following block is not fragmented 1-13: Block is active (used) not fragmented, next Block is fragmented, value is index of the segment 14: Block itself is fragmented 15: Block is free The commit bit is used to identify the validity state of the block. If it's value is identical to the value of a corresponding bit in the so called commit field (will be described in detail later on) the block is valid, if not the block is no longer valid and may be erased and included to the list of free blocks.

The block size is determined by:

The used platform (the block size should not be larger than the EEPROM page size and in case it is smaller it should consists of a whole number conversion)

The memory size

The data structure of the applications on the card

A standard page size of 64 bytes for each block is assumed. This includes the actual data as well as the overhead from the header size. This leads to a size of 60 bytes for the actual user data.

Figure 3:
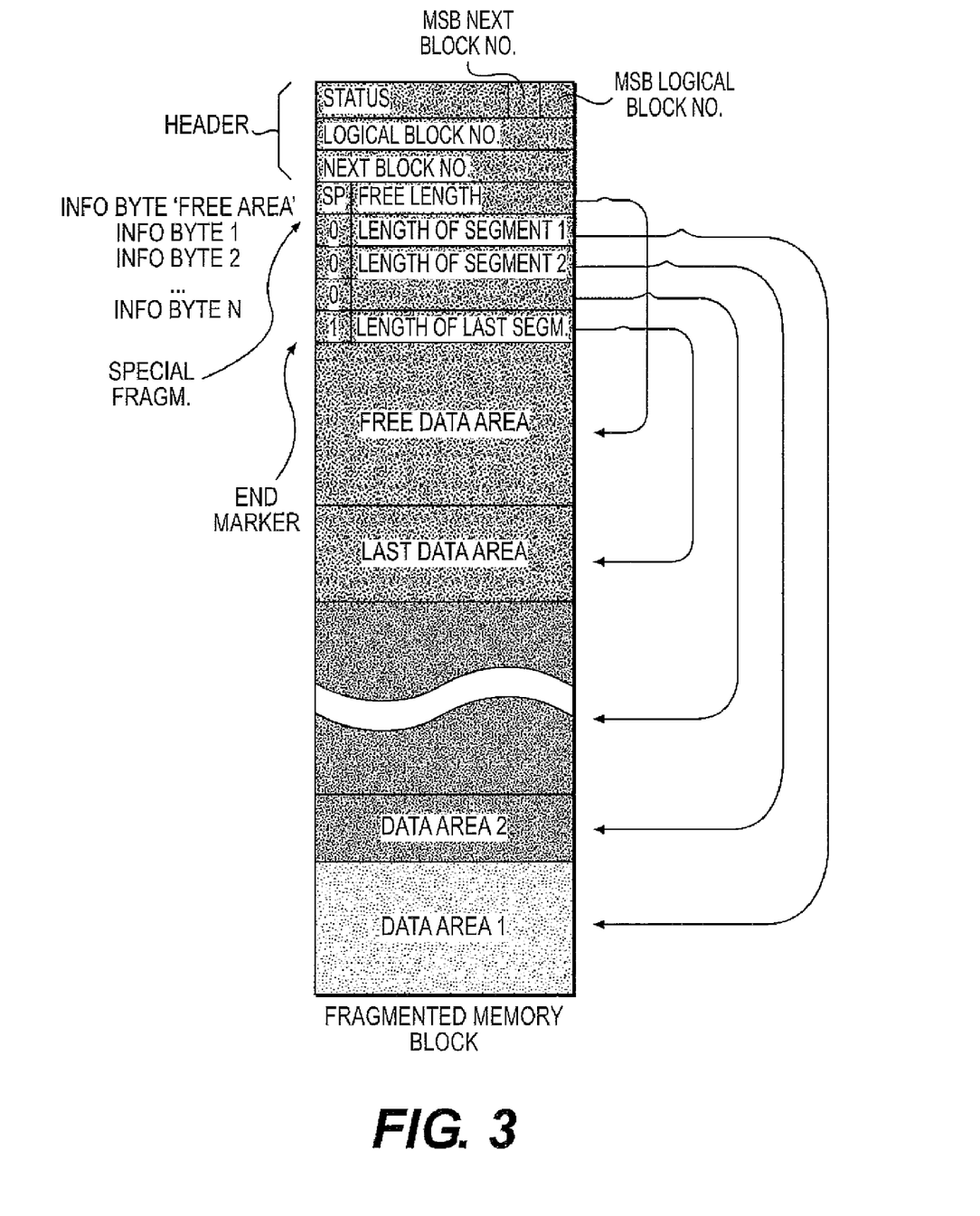
FIG. 3 structure of fragmented memory block

In FIG. 3 structure of a fragmented block is depicted which is based on that of the normal block in FIG. 2. The ID of a fragmented block id '0xE'. The block includes an extension located in that area which will be the data area, of a normal block. Here additional information is stored, which allows to split of the data are into different independent segments. It starts with a byte for the amount of free space in the block. Following is a list of segment sizes with an entry for every segment in the block.

Figure 4:
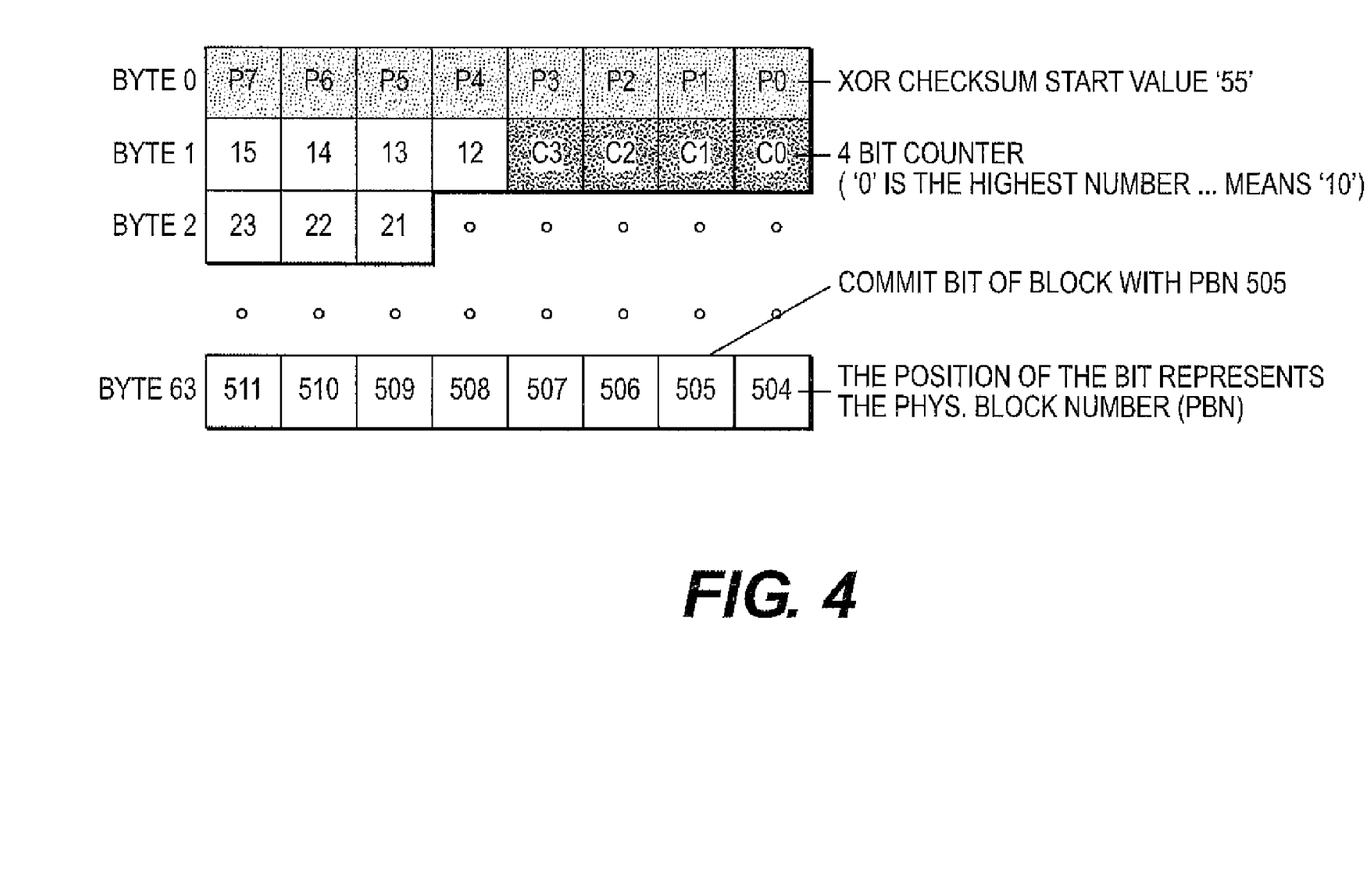
FIG. 4 structure of commit block

In FIG. 4 a structure of a commit block is depicted. The commit field consists of single bits each assigned to one memory block. The position of the bit corresponds to the PBN of the memory block. Only if the bit in the commit and the commit bit in the header of the corresponding block are identical the block is failed. If not the physical block is marked to be erased and be included to the list of free blocks.

Typically all commit bits of the field are located in one EEPROM page (a commit block). So writings and updates to the EEPROM memory done before updating the commit field can be switched to be valid within on single write operation on EEPROM. From the moment on the commit field (/commit block) is written a roll forward can be executed even if a power failure occurs. If the power failure occurs before a roll back will be performed. So it's possible to guarantee atomically of write operations even done in many single write cycles. This procedure together with the later described update operation implies a secure write mechanism.

To prevent the system from losing a valid commit field (respectively commit block) if a power failure occurs during updating the commit block, the commit block is doubled. Only one of the two commit block is valid at a time. An update of the commit block is always done by writing to the block not written to at the last update, because this is the invalid commit block. To distinguish the valid from the invalid block a 2 bit counter is added at the beginning of each commit block (C0, C1). The block with the higher counter value is the block written last, except one of the two counters has the value 11b and the other has the value 00b, then the block with the counter 00b is the last written one.

Figure 5:
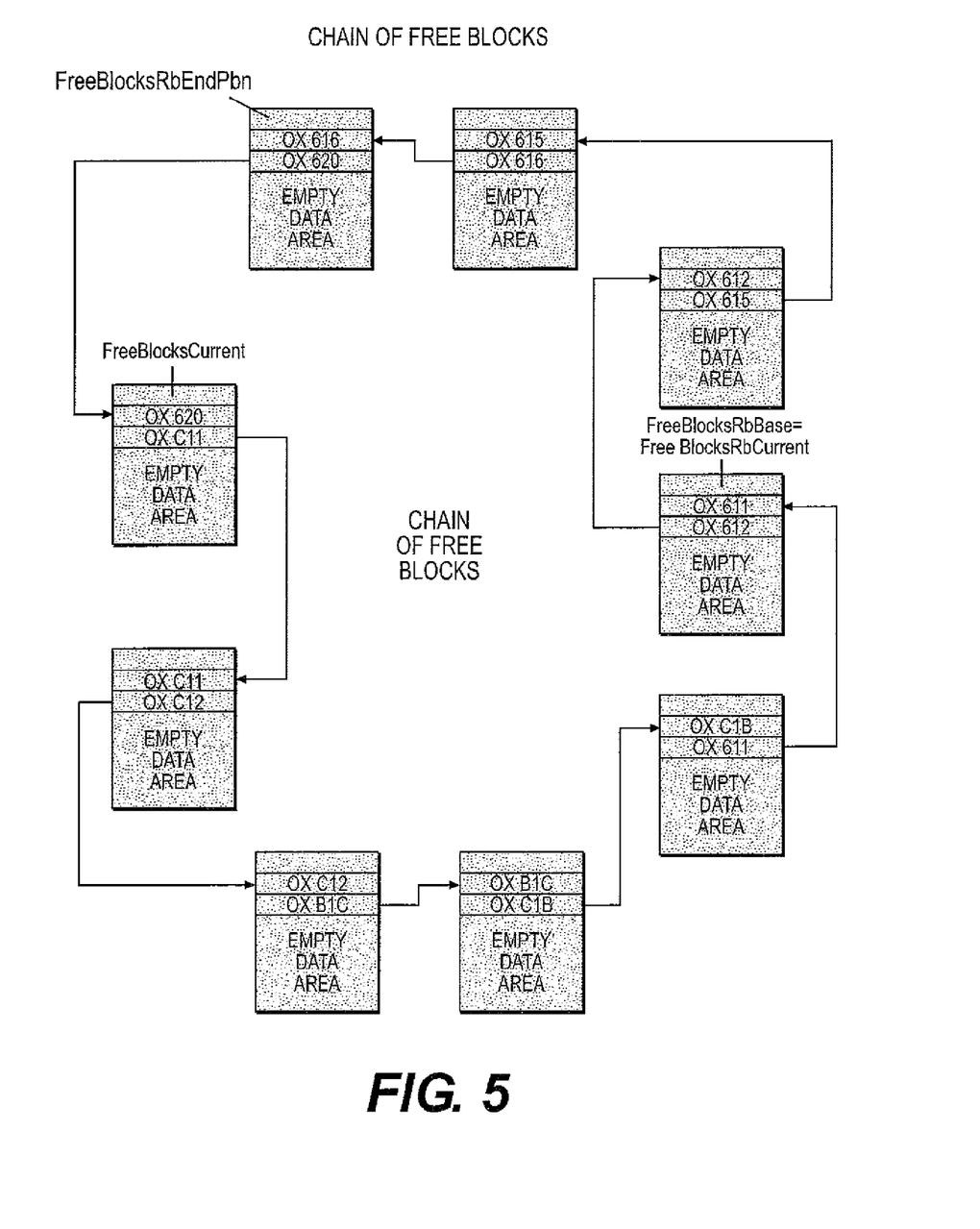
FIG. 5 chain of free block organized as a ringlist

FIG. 5 shows an example for a structure of free memory blocks organized in an ring list in order to simplify the handling of free and fragmented blocks. Both lists are organized as ring list. So it's not necessary to store the start of such a list in non volatile memory. It's enough to find a member of such a list on startup procedure and store it in RAM. It's necessary to have these list if new memory must be allocated.

Figure 6:
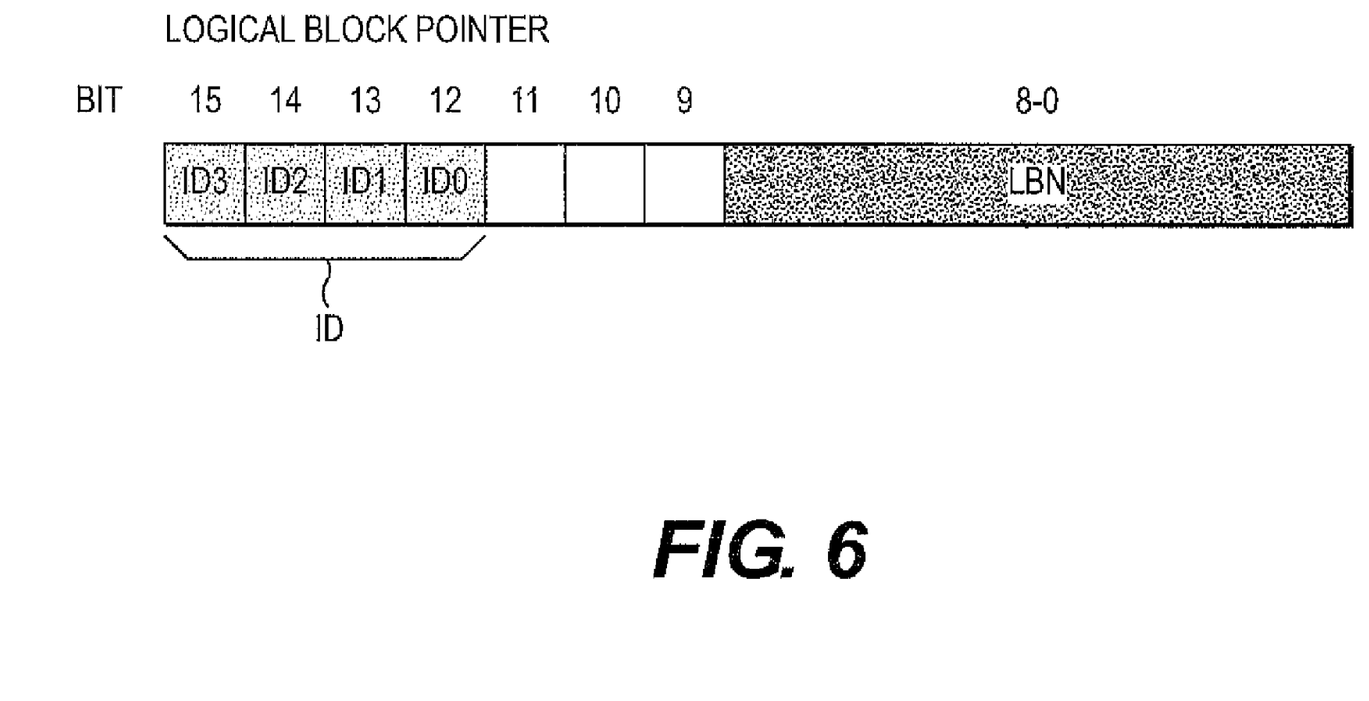
FIG. 6 structure of a logical block pointer

FIG. 6 describes the structure of a logical block pointer (LBP), which allows to identify data objects by their start block and segment (in case of fragmented block). Part of the LBP is the LBN.

As mentioned above a LBP contains a LBN with additional information to reference a data unit with user data. The main difference between LBNs and LBP is that LBNs are used to reference whole memory blocks and LBPs are used to reference the start of data within memory blocks. The upper 4 bits in a LBP represent the segment index of the data area in a fragmented block if a segment in fragmented block should be referenced. If these bits are all zero data in a not fragmented (normal) block is meant.

The symbols in FIG. 6 have the following meaning:
ID0-ID3: ID of the fragmented area, a part of the address
LBN: Logical Block Number (=phy BN, if memory type=ROM)

Note: To really access specific data within memory blocks an additional offset is needed. This offset bases at the start of the first block in a block chain.

Physical Block Numbers

The transformation of logical block numbers is done by the MM via the BAT. Physical block numbers are only used by the MM to calculate the physical memory address. In this way the BAT can be reduced to the absolutely necessary size.

Update Operation

Figure 7:
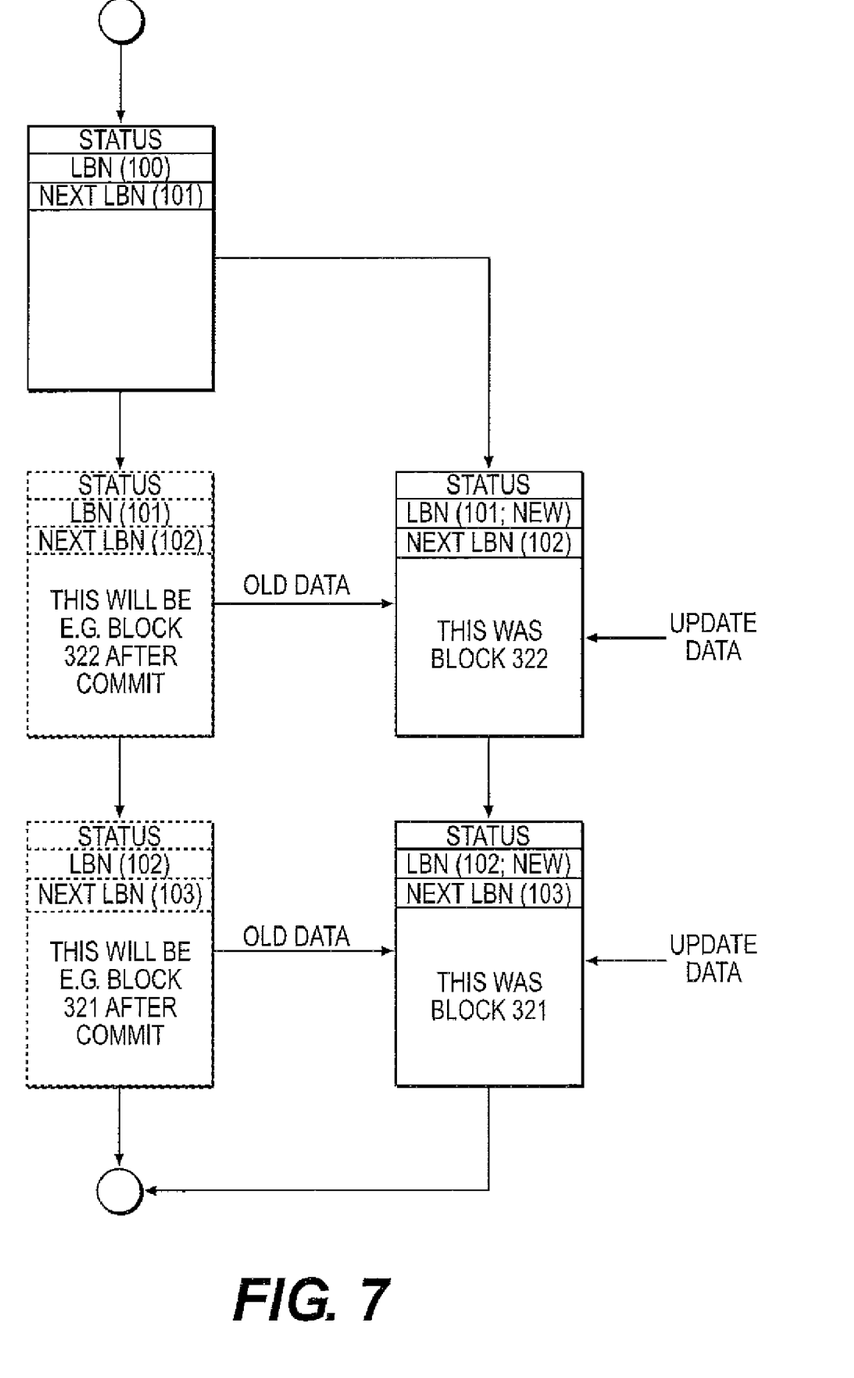
FIG. 7 flow structure of update process

The update process of data (FIG. 7) within the memory blocks is designed to guarantee a 'secure write' mechanism. To reach that the data which should be updated isn't touched until the new data is committed. The update data for a block is written together with the unchanged data of the block to a new (former free) block. As the time for writing to a physical EEPROM page is nearly independent of the amount of data bytes, no noticeable delays will be produced by the copying the unchanged data to the new block (see figure). If the update process has finished the operation may be committed by writing a new commit field. After this the old data blocks may be erased and the BAT is updated so that the physical blocks for the concerned logical blocks are exchanged. FIG. 9 shows the flow of an update process as described above.

Write Operation

Similar to update, but only free blocks are allocated no old data is copied and no blocks are erased after committing. Blocks keep their LBN→no BAT update necessary.

Delete Operation

No operation until commit, then blocks are marked in the commit field as false by toggling the corresponding bit. After commit the blocks are erased and included to the list of free blocks. Blocks keep their LBN→no BAT update necessary.

The invention claimed is:

1. A method for memory management in smart card controllers or similar restricted hardware environment by writing of data into a data space in a persistent memory, said method comprising:
   a) splitting the persistent memory into blocks with fixed data length having logical block numbers (LBN);
   b) selecting the size of blocks as such that it is equal to, or equivalent to an integer ratio of, the length of a page in EEPROM to the physical size of the pages of the EEPROM memory existing on the card;
   c) providing a Block Allocation Table (BAT) in order to calculate the physical place of the block in memory from the logical block number;
   d) defining a bit existing in each block header, whereby this bit corresponds to a bit existing in a commit block;
   e) where toggling of the bit existing in the commit block toggles the validity of the corresponding memory block;
   f) replacing individual memory blocks to accomplish a secure write mechanism by:
      1) writing the update data for a block together with the unchanged data of the block to a new formerly free block;
      2) committing the operation by writing a new commit field after finishing the update process; and
      3) erasing the old data blocks which contain non-updated data and updating the BAT so that the physical blocks for the updated logical blocks are exchanged, whereby respective old and new logical blocks are replaced by each other;
   g) typically all commit bits of the commit field form the commit block and are located in on EEPROM page to prevent the system from losing a valid commit field if a power failure occurs during updating the commit block, the commit block is doubled and only one of the two commit blocks is valid at a time whereby an update of the commit block is always done by writing to the commit block not written to at the last update, because this is the commit block not containing valid commit data, where by the validity of the invalid commit block is determined by a two-bit counter (C0, C1), which is added to each commit block.

2. The method according to claim 1, including the step of splitting a whole block into individual segments, each individual segment having a unique number in the order of its position, whereby each segment is belonging to a different data object.

3. The method according to claim 2, including the step of identifying a corresponding segment through the logical block number of the whole block and the unique number of the individual segment.

4. The method according to claim 2, including defining a block header in the block with a list of entries providing information to localize the segments as well as defining their length.

5. The method according to claim 1, wherein a linkage between blocks by writing the LBN of the following block to the header of the block before the following block is provided.

6. The method according to claim 1, wherein some kinds of blocks are organized in form of a ring list.

7. The method according to claim 1, wherein the commit bits are managed on a physical level.

* * * * *